United States Patent [19]

Coquard et al.

[11] Patent Number: 4,826,951

[45] Date of Patent: May 2, 1989

[54] HOMOGENOUS HEXAMETHYLENEDIAMINE/ADIPIC ACID/DIMER ACID COPOLYAMIDE PREPARATION

[75] Inventors: Jean Coquard, Craponne; Jean Goletto, Ecully, both of France

[73] Assignee: Rhone-Poulenc Chimie, Courbevoie, France

[21] Appl. No.: 71,187

[22] Filed: Jul. 8, 1987

[30] Foreign Application Priority Data

Jul. 8, 1986 [FR] France .................................. 86 10136

[51] Int. Cl.$^4$ ............................................. C08G 69/26
[52] U.S. Cl. .................................. 528/339.3; 528/336; 528/338; 528/340
[58] Field of Search ..................... 528/339.3, 336, 338, 528/340

[56] References Cited

U.S. PATENT DOCUMENTS 4,384,111 5/1983 Goletto et al. ................... 528/339.3
4,680,379 7/1987 Coquard et al. ................. 528/339.3

*Primary Examiner*—Harold D. Anderson
*Attorney, Agent, or Firm*—Burns, Doane, Swecker & Mathis

[57] ABSTRACT

Homogeneous copolyamides having high melting points and good flexibility, well adapted for the production of textile materials and plastic shaped articles, are prepared by prepolymerizing lower dicarboxylic acid(s) with an excess of hexamethylenediamine in the presence of a catalytically effective amount of a strong inorganic or organic oxyacid, or alkali or alkaline earth metal salt thereof, and thence polycondensing the resulting prepolymer with a fatty acid dimer.

13 Claims, No Drawings

HOMOGENOUS HEXAMETHYLENEDIAMINE/ADIPIC ACID/DIMER ACID COPOLYAMIDE PREPARATION

BACKGROUND OF THE INVENTION

1. Field of the Invention

The present invention relates to the preparation of homogeneous copolyamides having both high melting points and good flexibility, and, more especially, to such homogeneous copolyamides produced from hexamethylenediamine, either adipic acid alone or admixture thereof with at least one other lower or short-chain dicarboxylic acid and a fatty acid dimer, the amount of short-chain diacid(s) relative to the total amount of the acids present [short-chain acid(s)+dimer acid] ranging from 50 to 99 mole %.

2. Description of the Prior Art

Copolyamides of the aforesaid general type, based on hexamethylenediamine, adipic acid and dimer acid, are described in French Pat. No. 2,459,810, assigned to the assignee thereof. As utilized herein, by "homogeneous copolyamide" is intended a copolymer which forms a single phase in the melt state or a single amorphous phase in the solid state, as can be determined, for example, by scanning electron microscopy which reveals any dispersed phase which may be present, by fixing same with phosphotungstic acid.

A much simpler means for determining this homogeneity consists in observing the state of transparency, on the one hand, of a melt having a thickness of approximately 0.2 to 0.5 cm, heated to a temperature of at least 10° C. above its melting point and, on the other hand, of a small-diameter rod or film obtained from such melt after rapid cooling, for example, by immersion in water at ambient temperature. An absolutely or completely transparent rod or film indicates perfect homogeneity of the polymer. When the film is greater in thickness or when the cooling has been slower, a translucent zone may indicate a certain degree of crystallinity; a white film incorporating streaks or inclusions (fisheyes, for example) is the sign of a major heterogeneity. This homogeneity signals the fact that the copolymers in question have thermomechanical properties which can be readily reproduced, in addition to good transparency. Also as utilized herein, by a copolyamide having "good flexibility" is intended a copolyamide, the flexural modulus of which is significantly lower than that of the conventional polyamides, such as polyhexamethylene adipate (nylon 66) or polycaprolactam (nylon 6) and is on the order of, or lower than, that of the polyamides considered to be flexible, such as, for example, polyundecanamide (nylon 11).

In the copolyamides of the type of the aforesaid prior art, the crystallinity and, consequently, the ability to obtain high melting points and good thermomechanical properties, are essentially contributed by the group of segments which are derived from the condensation of the short-chain acid molecules (adipic acid) with a portion of the hexamethylenediamine molecules. The ability to have flexibility and good elasticity is substantially contributed by the group of segments which are derived from the condensation of the fatty acid dimer molecules with the other portion of the hexamethylenediamine molecules. It is apparent that, by changing the quantity of short-chain acid relative to the total amount of the acids present in the range from 50 to 99 mole %, copolyamides are obtained, the melting points of which will be more or less high and the flexibility of which will be more or less. The copolyamides in which the amount of short-chain acid is in the range of from 70 to 90 mole % are of particular interest because they have both high melting points and excellent flexibility.

A variety of specific processes enabling the preparation of such homogeneous copolyamides are also described in the aforementioned French patent. According to a first process, the following steps are carried out:

(1) prepolymers are prepared in a heterogeneous medium from a mixture of adipic acid, dimer acid and hexamethylenediamine, or from their corresponding salts, the amounts of the constituents of the beginning mixture being such that the quantity of adipic acid relative to the total acids is in the range of from 50 to 99 mole % and that the contents of amino groups and of carboxylic groups do not differ by more than 5% as an absolute value, the polymerization reaction consisting of adjusting the starting mixture up to a temperature of 270° C. by heating it in a gradual and uniform manner, over a period of time ranging from 30 minutes to several hours, at a water vapor pressure of from 1.3 to 2.5 MPa, which is the chemical equilibrium state corresponding to commencement of the following phase (2);

(2) a homogenization phase is then carried out for a period of from 0.5 to 5 hours, at a temperature of from 270° to 290° C. under a water vapor pressure of from 1.3 to 2.5 MPa, during which the equilibrium state of the amidification reactions remains unchanged; and (3) lastly, a polycondensation is conducted such as to convert the homogeneous prepolymers thus produced into the desired copolyamides, the polycondensation reaction being carried out in a conventional manner at a temperature of from 260° to 290° C. at atmospheric pressure or at a lower pressure, for a period of time ranging from 30 minutes to several hours.

In a second such process, the following steps are carried out:

(1) prepolymers are prepared in a heterogeneous medium from a mixture of adipic acid, dimer acid and hexamethylenediamine, or of the corresponding salts thereof, the amounts of the constituents of the starting mixture being such that the quantity of adipic acid relative to the total acids is in the range of from 50 to 99 mole % and that the contents of amino groups and of carboxylic groups differ by more than 5% as an absolute value, the prepolymerization reaction consisting of adjusting the temperature of the starting mixture to a temperature corresponding to the beginning of the following phase (2) in a gradual and uniform manner, over a period of time ranging from 30 minutes to several hours;

(2) a homogenization phase is then carried out for a period of time of from 10 minutes to 2 hours at a temperature of from 265° to 290° C.; and (3) lastly, the gradual addition of the deficient reactant is effected in a conventional manner and the polycondensation is completed at temperatures of from 260° to 290° C. at atmospheric pressure, or at a lower pressure, for a period of time ranging from 30 minutes to several hours until the desired copolyamides are produced.

Lastly, in a third process, copolymers are directly produced at a temperature of from 150° to 300° C., in a homogeneous medium, from a mixture of adipic acid, dimer acid and hexamethylenediamine, the amount of adipic acid relative to the amount of total acids being in the range of from 50 to 99 mole % and the contents of amino groups and of carboxylic groups not differing by more than 5% as an absolute value, the medium being rendered homogeneous by the use of a third solvent for the mixture of the three starting materials or of the corresponding salts and/or the oligomers of adipic acid and hexamethylenediamine and dimer acid and hexamethylenediamine having a molecular weight of below 5,000, the said solvent being inert vis-a-vis the amidification reactants and reactions.

SUMMARY OF THE INVENTION

Accordingly, a major object of the present invention is the provision of improved homogeneous copolyamides by a process permitting avoidance of:

(a) employing an intermediate homogenization step at a high temperature, which is apt to excessively lengthen the time of utilization of industrial reactors and to prematurely result in a degree of degradation of the copolyamides; as well as (b) the use of an organic solvent, the recovery of which is likely to promote additional difficulties.

Briefly, the present invention features the preparation of homogeneous copolyamides having both high melting points and good flexibility, from hexamethylenediamine, short-chain dicarboxylic acid(s) and a fatty acid dimer, the amount of lower or short-chain acid(s) relative to the total amount of the acids present ranging from 50 to 99 mole %, the process of the invention being characterized by the following parameters:

in a first step (a), a prepolymer having amino end groups is prepared by reacting, optionally in the presence of water at the beginning of such step, the following starting materials:

(i) either a mixture of the following constituents: adipic acid, optionally at least one other short-chain dicarboxylic acid of a saturated alicyclic or aromatic type, hexamethylenediamine, and a catalyst which is either a compound (alpha) or a compound (beta), with (alpha) comprising an inorganic oxyacid or an organic oxyacid other than a carboxylic acid, in which at least one of the acid groups, when there exist a plurality of same, has an ionization constant pKa in water at 25° C. which does not exceed 4, and (beta) comprising an alkali metal or alkaline earth metal salt of such acid; or (ii) a mixture of the following constituents: stoichiometric salt(s) of the aforementioned short-chain acid(s) with hexamethylenediamine, free hexamethylenediamine and the catalyst described above; said first step (a) being carried out, in the absence of the distillation of water in a closed system of the autoclave type, under the following conditions:

the amount of water, when any indeed exists, initially present in the reaction mixture, expressed as a percentage by weight based on the total amount of water initially present+reactants, does not exceed 45%;

the temperature of the starting mixture is gradually raised, by heating, to a temperature in the range of from 200° to 250° C. and the reactants are permitted to react at this temperature and at an autogenous pressure greater than atmospheric pressure, for a period of time which is sufficient to enable the reaction mixture to attain a state of chemical equilibrium of the amidification reactions corresponding to the beginning of the following step (b); and (b) in a second step, the prepolymer is reacted with the fatty acid dimer, which is gradually added to the reaction mixture such that:

the operation is carried out at a temperature in the range of from 200° to 280° C., at an autogenous pressure which, during the period of addition of the dimer acid, is equal to the prepolymerization pressure [case (1)], or is higher than this pressure [case (2)], or gradually decreases from the prepolymerization pressure to atmospheric pressure case (3)] and which, after the addition of the dimer acid, gradually decreases to a value which may be atmospheric pressure [for cases (1) and (2)] or a pressure below atmospheric [for cases (1), (2) and (3)] or remains equal to atmospheric pressure [for case (3)], a simultaneous distillation of water being ensured, on the one hand, if desired, during the period of addition of the dimer acid and, on the other hand, during the period following the addition of the dimer acid, with the proviso that, upon completion of the period of addition of the dimer acid, the ratio $r_1$, defined below:

$$\frac{\text{weight of reactants in step (a)} + \text{weight of dimer acid}}{\text{weight of reactants in step (a)} + \text{weight of dimer acid} + \text{weight of residual water}}$$

has a value in the range of from 0.915 to 1, if need be by removing water by distillation during the period of addition of the dimer acid, and the dimer acid, once addition thereof is complete, is reacted for a period of time which is sufficient to produce a copolyamide having the desired viscosity, and the proportions of the various constituents are such that:

the amount of short-chain acid(s) relative to the total amount of short-chain acid(s)+dimer acid ranges from 50 to 99 mole %;

the ratio $r_2$ of the number of moles of hexamethylenediamine employed in step (a), option (i), relative to the total number of moles of short-chain acid(s) and of dimer acid is equal to 1 or optionally equal to a value which is greater than stoichiometric and is determined such as to provide the reaction mixture with an excess of hexamethylenediamine, thus compensating for any loss of this reactant which may occur in step (b) during the pressure release; and the ratio $r_3$ of the number of moles of free hexamethylenediamine employed in step (a), option (ii), relative to the number of moles of dimer acid has a value indicated above for the ratio $r_2$.

DETAILED DESCRIPTION OF THE PREFERRED EMBODIMENTS OF THE INVENTION

More particularly according to the present invention, in a preferred embodiment thereof, the steps (a) and (b) described above are carried out in sequence, but in the presence of water in the reaction mixture at the beginning of step (a), and the amount of water initially present not exceeding 45%, as indicated above.

In the present description, the pressure referred to is always absolute pressure.

By "water initially present in the reaction mixture" is intended the water which is initially introduced, in addition to the reactants, into the reaction mixture in step (a), plus, if appropriate, the water used as solvent for the reactants employed in the form of a solution. In this case, the term "reactants" includes the short-chain diacid(s), hexamethylenediamine and the catalyst and, unless indicated otherwise, the subject materials are in the dry state.

By "residual water" is intended: either the amount of water present at the beginning of step (a), when no water has been distilled off up and until completion of the addition of the dimer acid, or, when water has been distilled off during the addition of the dimer acid, the difference: amount of water initially present—amount of water distilled off up and until completion of the addition of the dimer acid.

It is apparent that, when the step (a) is carried out in the absence of water at the beginning of this step, the period of addition of the dimer acid will elapse without water distillation taking place and the amount of residual water will be nil and the ratio $r_1$ referred to above will be equal to 1. This ratio will also be equal to 1 when the amount of water distilled off until completion of the addition of the dimer acid corresponds to the amount of water present at the beginning of step (a).

By the term "copolyamide having the required viscosity" is intended a copolyamide which has a sufficiently high melt viscosity to be capable of being injection-molded, or extruded in conventional manner. More particularly, a copolyamide is intended having a melt viscosity (measured under conditions which are defined hereinafter) of at least 1,500 poises and preferably from 3,000 to 60,000 poises.

As regards the loss of hexamethylenediamine, referred to above, this can arise, for example, when the apparatus used does not incorporate a distillation column. Under these conditions, for given equipment and for given material charges, simple methods may be used to determine the amount of hexamethylenediamine entrained during each operation and, consequently, the excess of this reactant to be introduced into the initial reaction mixture to preserve the equivalence between the amino groups and the carboxyl groups which interreact. In general, when a loss of hexamethylenediamine occurs, it is very moderate, and this is one of the advantages according to the present invention. It has been found that the use of amounts of this reactant which result in the ratios $r_2$ and $r_3$ having values ranging from a number greater than 1 to 1.1 are suitable. The loss of hexamethylenediamine, expressed as a weight percentage based on the total amount of diamine employed, generally amounts to less than 1% and may even attain values as low as those below 0.3%.

It is also apparent that, by "short-chain acid(s)", is intended either adipic acid as such or admixed with at least one other short-chain dicarboxylic acid of a saturated alicyclic or aromatic nature. Preferably, alicyclic and/or aromatic dicarboxylic acids according to the present invention are compounds containing at most 12 carbon atoms: 1,4-cyclohexanedicarboxylic acid, isophthalic acid, and terephathlic acid are representative of suitable diacids of this type. The proportion of adipic acid in the mixture of short-chain diacids which may be employed usually constitutes at least 70 mole %.

It is believed that, during the homogenization step employed in the aforementioned French patent, the amino and carboxyl groups, which no longer undergo an amidification reaction at this time, form "breaks" in the block oligomers of adipic acid with hexamethylenediamine and/or oligomers of dimer acid with hexamethylenediamine and that, as a result, a homogeneous random prepolymer is formed. It is also reasoned that, according to the present invention, the prepolymer formed in step (a) is in the form of a homogeneous preformed polyhexamethylene amide structure, the homogeneity of which, surprisingly, is not altered by the subsequent addition of a dimer acid whose oligomers with hexamethylenediamine are, however, incompatible with those of the preformed polyhexamethylene amide.

The dimer acids employed are obtained by polymerization of compounds containing 80 to 100% by weight of monomeric fatty acid(s) containing from 16 to 20 carbon atoms and 20 to 0% by weight of monomeric fatty acid(s) contaiing from 8 to 15 carbon atoms and/or from 21 to 24 carbon atoms. By "monomeric fatty acids" are intended saturated or unsaturated, straight or branched chain aliphatic monoacids.

Exemplary of the straight or branched chain saturated monomeric fatty acids, representative are: caprylic, pelargonic, capric, lauric, myristic, palmitic and isopalmitic, stearic, arachidic, behenic and lignoceric acids.

Exemplary of the straight or branched chain monomeric fatty acids containing ethylenic unsaturation(s), representative are: 3-octenoic, 11-dodecenoic, oleic, lauroleic, myristoleic, palmitoleic, gadoleic, cetoleic, linoleic, linolenic, eicosatetraenoic and chaulmoogric acids. Some acids comprising acetylenic unsaturation may also result in polymeric acids, but they do not occur naturally in quantities of interest and, as a result, the economics associated with same is very low.

The polymeric fatty acids produced by thermal polymerization, in the presence of catalysts such as peroxides or Lewis acids, if appropriate, may be fractionated, for example, by using conventional vacuum distillation or solvent extraction methods. They can also be hydrogenated to reduce their degree of unsaturation and, thus, to reduce their coloration.

The dimer acids which are preferably employed in the present invention are fractionated polymeric fatty acids, in which the difunctional acid fraction is greater than 94% by weight, the monofunctional acid fraction is less than 1% by weight and even more preferably does not exceed 0.5% by weight, the fraction of acid having a functionality greater than 2 is less than 5% by weight and still more preferably does not exceed 3% by weight.

Still more preferably, the dimer acids employed are the species obtained by fractionation (resulting in the fractions indicated above) of polymeric fatty acids which have additionally been subjected to hydrogenation.

The dimer acids which are most especially preferred are the species obtained by fractionation of a hydrogenated composition originating from the catalytic polymerization of monomeric fatty acid(s) containing 18 carbon atoms. In this respect, due to their ready availability and their relatively facile polymerization, oleic, linoleic and linolenic acids, whether alone, or as pairs thereof, or, preferably, in the form of a ternary mixture, are the starting materials which are most especially preferred for the preparation of the polymeric fatty acids.

Concerning the strong organic or inorganic oxyacid (alpha) which is used as the catalyst, preferred is an oxygen-containing mono- or polyacid in which at least one of the acid functions has an ionization constant pKa in water at 25° C. which does not exceed 4.

As strong acids which are suitable, there may be mentioned, for example:

Among the inorganic oxyacids, sulfurous, sulfuric, hypophosphorous, phosphorous, orthophosphoric or pyrophosphoric acids;

Among the organic oxyacids:

the organosulfonic acids of the formula $R_1—SO_3H$ (I), in which $R_1$ denotes: a straight or branched chain alkyl radical containing from 1 to 6 carbon atoms; a phenyl radical optionally substituted by 1 to 3 alkyl radicals containing from 1 to 3 carbon atoms; a phenylalkyl radical containing from 1 to 3 carbon atoms in the alkyl moiety and in which the benzene nucleus may optionally be substituted by 1 to 3 alkyl radicals containing from 1 to 3 carbon atoms; or a naphthyl radical optionally substituted by 1 to 4 alkyl radicals containing from 1 to 3 carbon atoms;

the organophosphonic acids of the formula $R_2—P(O)(OH)_2$ (II), in which $R_2$ denotes an alkyl radical, a phenyl radical or a phenylalkyl radical, each of these radicals having the definition given above for $R_1$;

the organophosphinic acids of the formula $R_3R_4—P(O)(OH)$ (III), in which $R_3$ and $R_4$, which are identical or different, each denote: a straight chain alkyl radical containing from 1 to 3 carbon atoms; a phenyl radical or a phenylalkyl radical, each of the latter two radicals having the definition given above for $R_1$;

the organophosphonous acids of the formula $R_5H—P(O)(OH)$ (IV), in which $R_5$ denotes: a straight or branched chain alkyl radical containing from 1 to 4 carbon atoms (the branching being excluded for an alkyl radical containing four carbon atoms); a phenyl radical or a phenylalkyl radical, each of the latter two radicals having the definition given above for $R_1$.

As a strong acid (alpha), it is preferred to use the acids derived from phosphorus, and more particularly the hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

Insofar as the (beta) acid salt is concerned, an alkali metal or alkaline earth metal salt derived from an inorganic or organic oxyacid (alpha) is typically used.

Salts which are completely soluble in the reaction mixture are preferably as the salt (beta). Among these preferred salts (beta), the sodium and potassium salts derived from the particular suitable types of inorganic or organic oxyacids (alpha), referred to above, are quite advantageous. The salts (beta) which are especially suitable are sodium and potassium salts originating from the preferred phosphorus-derived acids referred to above.

The proportions of strong acid (alpha) or salt (beta), expressed as a weight percentage relative to the final copolyamide, typically range from 0.1 to 1%, and preferably from 0.01 to 0.5%. In addition to a catalytic effect during the polycondensation reaction, the strong acids (alpha) or their salts (beta), and especially the phosphorus-derived compounds of this type, have the advantage of imparting to the final copolyamide a certain protection against degradation due to light.

If good operation of the process according to the present invention is to be ensured, care will be taken, in particular, to observe as perfectly as possible the corresponding proportions of the various constituents employed. In a preferred embodiment of the invention, in step (a), the short-chain diacid(s) is (or are) used in the form of its (or their) salt(s) with hexamethylenediamine [variant (ii)]. In order to ensure, on the one hand, stoichiometry in the production of the salt(s) of short-chain acid(s) with hexamethylenediamine and, on the other hand, the stoichiometry or the intended excess in the stoichiometry between free hexamethylenediamine and the dimer acid, the procedure may be carried out by precise weighing of the reactants, the concentration of which is accurately determined at the point in time of use. The stoichiometry of the salt(s) of the short-chain acid(s) can be monitored by measuring the pH of specimen solutions produced by diluting the salt(s) in a suitable solvent. It is also possible to monitor the stoichiometry or the intended stoichiometric excess in the amidification reaction between the free amino groups in the prepolymer and the dimer acid by control of the viscosity, which may advantageously be assessed by in situ measurement of the resistant torque of mechanical stirring of the polycondensation mixture in step (b).

To carry out the process according to the invention, hexamethylenediamine may be used in solid-state, in melt-state, or in the form of an aqueous solution. The salt(s) of short-chain acid(s) and hexamethylenediamine may also be used in solid-state, in melt-state or in the form of an aqueous solution.

As regards conducting step (a) of the preferred process according to the invention [performed in the presence of water at the beginning of step (a)], the amount of water initially present in the reaction mixture is preferably in the range of from 5 to 45% and, still more preferably, from 9 to 40%, and the reactants are preferably permitted to react at a temperature in the range of from 205° to 230° C. for a period of time which depends on the temperature selected, ranging, for example, from 20 minutes (when the selected temperature is 230° C.) to 2 hours (when the selected temperature is 205° C.) at an autogenous pressure ranging from 1.1 to 3 MPa.

With respect to conducting the step (b) which follows step (a), carried out in the preferred manner as indicated above, the operation is preferably carried out by combining the following steps:

all of the dimer acid is introduced gradually, for example, over a period of time ranging from 10 minutes to 2 hours, with the following parameters being observed:

the temperature of the reaction mixture is maintained equal to the prepolymerization temperature, the pressure is maintained equal to the prepolymerization pressure or is increased to a value which is 5 to 40% higher than the prepolymerization pressure, it is ensured, if desired by removing water by distillation, that the ratio $r_1$, defined above, has a value in the range of from 0.930 to 1 upon completion of addition of the dimer acid, when the aforementioned addition of dimer acid is complete, after stirring of the reaction mixture has continued, if appropriate, at the aforesaid pressure for a period ranging, for example, from 10 minutes to 1 hour, the temperature being increased, if appropriate, over the same period to a value above that employed during the period of addition of the dimer acid, in the range of from 205° to 240° C., the following operations are then carried out:

the pressure is gradually decreased, over a period ranging, for example, from 10 minutes to 2 hours, from the value employed during the period of addition of the dimer acid to atmospheric pressure, the temperature of the reaction mixture is raised over the same time to a value higher than the temperature which is either that employed during the period of addition of the dimer acid or that attained at the end of the period (if any) of super-heating, which immediately follows the period of addition of the dimer acid, this temperature, once raised, being in the range of from 205° C. to 280° C., a steady distillation of water is further ensured over the same time period, and a reduced pressure equal to or lower than 600 $10^2$ Pa is then gradually established over a period ranging, for example, from 5 minutes to 1 hour, the polycondensation then being terminated while the mixture continues to be stirred at the aforementioned temperature in the range of from 205° C. to 280° C., at the reduced pressure indicated above, for a period ranging, for example, from 10 minutes to 1 hours, while a simultaneous distillation of water is maintained. It is possible to add the mixture for preparing the copolyamides produced in accordance with the present process, without inconvenience, one or more additives such as, especially: stabilizers or inhibitors of degradation due to oxidation, to ultraviolet, to light or heat; lubricants; colorants; nucleating agents; antifoaming agent and inorganic fillers.

In the event that the reaction mixture in step (a) initially contains an amount of water which is greater than 45%, it is apparent that, in a first stage, before commencing step (a), an operation to concentrate the reaction mixture may be carried out, for example, by distilling off water at atmospheric pressure or under reduced pressure and under low temperature conditions which do not permit an amidification reaction to develop in any way, such as to reduce the amount of water present at the beginning of step (a) to the indicated value not exceeding 45%.

This invention makes it possible to produce homogeneous copolyamides which have good thermal resistance and mechanical strength due to their high melting points and in improved flexibility at the same time. Being perfectly homogeeous, they have improved transparency and may be used in the usual injection-molding techniques, extrusion or spinning methods to provide useful shaped articles components, films or fibers having very high uniformity.

In order to further illustrate the present invention and the advantages thereof, the following specific examples are given, it being understood that same are intended only as illustrative and in nowise limitative.

In said examples to follow, a number of controls were carried out. Similarly, various properties were measured. The operating techniques and/or the standards according to which these controls and measurements were carried out are set forth immediately below.

MICROCALORIMETRIC ANALYSIS

The polymers were characterized by melt characteristics such as the melting endotherms Em and the crystallization exotherms Ec.

These determinations were carried out using a specimen subjected to temperature variations of 10° C./minute, both increasing and decreasing. In this manner, a differential microcalorimetry curve was determined, on which it was possible to observe the melting point (Tm) and the point of crystallization on cooling (Tc).

MELT VISCOSITY

This was measured at 260° C. under a variable shear gradient (indicated in the examples below) with the aid of a Davenport rheometer. The results are expressed in poises.

DETERMINATION OF THE END GROUPS IN THE COPOLYAMIDE

The method described below made it possible to estimate both types of end groups on a single test sample and with a single acidimetric titration. The polyamide was dissolved under stirring in a mixture of trifluoroethanol and chloroform at ambient temperature. After it had dissolved, a 0.05N aqueous alcoholic solution of tetrabutylammonium hydroxide was added and a potentiometric titration was finally carried out using a standardized solution of 0.05N hydrochloric acid under a stream of nitrogen. The use of the potentiometric curve exhibiting two potential steps enabled the two types of end groups to be determined.

DETERMINATION OF MECHANICAL TENSILE PROPERTIES

These were determined at 25° C. on specimens conditioned at an RH of 0 according to the French standard NF T 51 034 (in an Instron-type tensometer at a traction speed of 10 mm/min). Conditioning at an RH of 0: the specimens were placed over silica gel in a desiccator and were dried for 24 hours at ambient temperature at 0.66 to 1.33 $10^2$ Pa before the measurements were taken.

TORSIONAL MODULUS

This was determined at several temperatures (−20° C., 0° C., +20° C., +40° C., +60° C.) with an automatic torsion pendulum at a frequency on the order of 1 hertz in accordance with the ISO standard R 537. The specimens were conditioned at an RH of 0. The results are expressed in MPa.

DETERMINATION OF THE LOSS OF HEXAMETHYLENEDIAMINE

A quantitative estimation was made at the end of step (b) on an aliquot portion of the total aqueous distillate collected. A potentiometric titration was carried out using a standardized 0.1N solution of hydrochloric acid. The loss of hexamethylenediamine is expressed as a weight percentage based on the total amount of diamine employed [free diamine+any diamine present as a constituent of the salt(s) of the short-chain acid(s)].

Also in said examples to follow, wherever reference is made to the dimer acid employed, the compound used was that marketed by Unichema Chemie under the trademark Pripol 1010, in which the difunctional acid fraction was greater than 95% by weight. This difunctional acid fraction consists of a mixture of isomers containing 36 carbon atoms, in which the predominant species is a saturated compound of the formula:

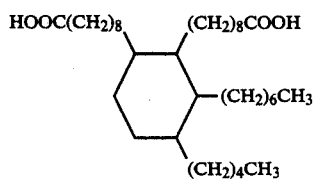

The monofunctional acid fraction (the weight proportion of which will be detailed below) consisted substantially of oleic acid; as for the fraction of acid with a functionality greater than 2 (the weight proportion of which will also be detailed below), this consisted substantially of a mixture of isomeric trimers containing 54 carbon atoms; the mean molecular weight of this dimer acid was on the order of 571.

EXAMPLE 1

The operation was carried out in a 7.5-liter stainless steel autoclave fitted with mechanical stirring means, a heating system and a system which made it possible to operate at a pressure above atmospheric pressure or below atmospheric pressure. The apparatus also comprised a device permitting a liquid reactant to be introduced into the autoclave, under pressure, and a device permitting water to be removed.

Step (a):

The following materials were introduced into the apparatus at ambient temperature:

(i) hexamethylenediamine salt of adipic acid, in equimolar proportions, in dry solid form: 2086.7 g (7.955 moles);

(ii) demineralized water: 1,048 g;

(iii) aqueous solution containing 32.5% by weight of hexamethylenediamine: 746.5 g, i.e., 242.6 g of pure hexamethylenediamine (2.088 moles) and 503 g of water of solution;

(iv) aqueous solution containing 50% by weight of hypophosphorous acid: 6 g, i.e., 3 g of water of solution;

(v) silicone antifoaming agent marketed by Rhône-Poulenc Specialites Chimiques under the trademark Rhodorsil Si 454:0.2 g.

With these charges, the amount of water initially present in the reaction mixture was to 1,554.9 g and it represented 40% by weight of the total: water initially present+reactants.

Stirring was commenced and 5 nitrogen purges were carried out by pressurization to 7 $10^5$ Pa, followed by pressure release. The temperature of the stirred mixture was gradually raised to 210° C. over 1 hour (an autogenous pressure of 1.8 MPa) and the reactants were permitted to react under these conditions for 1 hour.

Step (b)

While the aforementioned conditions of temperature and pressure were maintained, 1,140 g (1.996 moles) of a fatty acid dimer marketed under the trademark Pripol 1010 by Unichema Chemie, which had a monomer content of 0.03% by weight and a trimer content of 3% by weight, were introduced into the stirred mixture by being steadily run therein over 1 hour, 10 minutes; during the period of addition of the dimer acid, a steady distillation of water was ensured under rate conditions which enabled 1,320 g of water to be collected upon completion of the addition of the dimer acid.

Upon completion of the addition of the dimer acid, the weight of residual water was 234.9 g and the ratio $r_1$ defined above had a value of 0.937.

Water distillation was continued to a minor extent for 30 minutes to attain a temperature of 230° C. at a pressure of 1.8 MPa.

The autoclave pressure was then released gradually, over a period of 90 minutes, down to atmospheric pressure and the temperature was gradually raised to 260° C. over the same period, while a steady distillation of water was continuously ensured.

A pressure of 120 $10^2$ Pa was then gradually established over 30 minutes, while the mixture was maintained at 260° C. and the polymerization was completed by continuing to stir the mixture at 260° C. and 120 $10^2$ Pa for 20 minutes, again while a steady distillation of water was continuously ensured.

The loss of hexamethylenediamine, measured at the end of step (b), was 0.29%.

Stirring was stopped, and then a nitrogen pressure of 5 $10^5$ Pa was established in the autoclave and the polymer was drawn off. The latter, extruded from the autoclave in rod form, was cooled by passing same through a cold water bath, and it was then granulated and dried.

The polymer obtained was perfectly transparent and consequently homogeneous. It had the following characteristics, measured on dry granules thereof:

(1) Melting point (Tm): 240° C.,
(2) Crystallization point on cooling (Tc): 186° C.,
(3) End group contents:
  COOH: 85.62 meq/kg
  $NH_2$: 4.92 meq/kg
(4) Melt viscosity at 260° C. under a shear gradient:
  $\gamma = 10 \ s^{-1}$: 11,000 poises,
(5) Tensile properties:
  Break strength: 64.3 MPa,
  Elongation at break: 260%,
  Tensile modulus: 760 MPa,
(6) Torsional thermomechanical properties; torsional modulus at:
  −20° C.: 690 MPa,
  0° C.: 660 MPa,
  +20° C.: 580 MPa,
  +40° C.: 320 MPa,
  +60° C.: 150 MPa.

COMPARATIVE EXAMPLE A

In this example, it was shown (with all the remaining operating conditions of the invention being observed) that, when the amount of water initially present in the reaction mixture (expressed as a percentage by weight based on the total amount of water initially present+reactants) was greater than 45%, the polymer obtained was opaque and heterogeneous.

The operation was carried out in a 7.5-liter stainless steel autoclave as in Example 1.

Step (a)

Charges:

(i) hexamethylenediamine salt of adipic acid, in dry solid form: 2,086.7 g (7.955 moles);

(ii) demineralized water: 1.825.4 g;

(iii) aqueous solution containing 32.5% by weight of hexamethylenediamine: 746.5 g, i.e., 242.6 g of hexamethylenediamine (2.088 moles) and 503.9 g of water of solution:

(iv) aqueous solution containing 50% by weight of hypophosphorous acid: 6 g, i.e., 3 g of water of solution;

(v) silicone antifoaming agent of Example 1: 0.2 g.

With these charges, the amount of water initially present in the reaction mixture was 2,332.3 g and it represented 50% by weight of the total amount of water initially present+reactants.

The operating procedure was identical to that described in Example 1.

Step (b)

Charges:
dimer acid: 1,140 g (1,996 moles).

The operating procedure was identical to that described in Example 1, the only changes being as follows:

2,091 g of water were collected by distillation upon completion of the addition of the dimer acid; the weight of residual water was 241.3 g and the ratio $r_1$ also had a value of 0.935 in this case.

The reduced pressure which was established was 400 $10^2$ Pa.

The polymer obtained was opaque and consequently heterogeneous. It had the following characteristics, measured on dry granules thereof:
(1) Melting point (Tm): 248° C.,
(2) Crystallization point on cooling (Tc): 188° C.,
(3) End group contents:
   COOH: 32.7 meq/kg
   NH$_2$: 25.5 meq/kg.

COMPARATIVE EXAMPLE 8

In this example, it was shown (with all the remaining operating conditions of the invention being observed) that, when the ratio $r_1$ had a value which was lower than 0.915 at the end of the period of addition of the dimer acid, the polymer obtained was opaque and heterogeneous.

The operation was carried out in a 7.5-liter stainless steel autoclave equipped as in Example 1.

Step (a)

Charges:
(i) hexamethylenediamine salt of adipic acid, in dry solid form: 2,086.7 g (7.955 moles);
(ii) demineralized water: 1,048 g;
(iii) aqueous solution containing 32.5% by weight of hexamethylenediamine: 746.5 g, i.e., 242.6 g of hexamethylenediamine (2.088 moles) and 503.9 g of water of solution;
(iv) aqueous solution containing 50% by weight of hypophosphorous acid: 6 g, i.e., 3 g of water of solution;
(v) silicone antifoaming agent of Example 1: 0.2 g.

With these charges, the amount of water initially present in the reaction mixture was 1,554.9 g and it represented 40% by weight of the total amount of water initially present+reactants.

The operating procedure was identical to that described in Example 1.

Step (b)

Charges:
dimer acid: 1,140 g (1.996 moles).

The operating procedure was identical to that described in Example 1, the only changes being as follows:

1,170 g of water were collected by distillation at the end of the addition of the dimer acid; the weight of residual water was 384.9 g and the ratio $r_1$ then had a value of 0.900.

The reduced pressure which was established was 500 $10^2$ Pa.

The polymer obtained was opaque and consequently heterogeneous. It had the following characteristics, measured on dry granules thereof:
(1) Melting point (Tm): 245° C.,
(2) Crystallization point on cooling (Tc): 189° C.

EXAMPLE 2

The operation was carried out in a 7.5-liter stainless steel autoclave equipped as in Example 1.

Step (a)

Charges:
(i) hexamethylenediamine salt of adipic acid, in dry solid form: 1,739 g (6.629 moles);
(ii) demineralized water: 203.6 g;
(iii) pure hexamethylenediamine: 177.5 g (1.527 moles);
(iv) aqueous solution containing 50% by weight of hypophosphorous acid: 2.5 g, i.e., 1.25 g of water of solution;
(v) silicone antifoaming agent of Example 1: 0.2 g.

With these charges, the amount of water initially present in the reaction mixture was 204.85 g and it represented 9.65% by weight of the total amount of water initially present+reactants.

Stirring was commenced and 5 nitrogen purges were carried out by pressurization to 7 $10^5$ Pa, followed by pressure release. The temperature of the stirred mixture was raised gradually to 210° C. over 1 hour (an autogenous pressure of 1.4 MPa) and the reactants were permitted to react for 30 minutes under these conditions.

Step (b)

While the aforementioned conditions of temperature and pressure were maintained, 872 g (1.527 moles) of a fatty acid dimer marketed under the trademark Pripol 1010 by Unichema Chemie, which had a monomer content of 0.03% by weight and a trimer content of 3% by weight, were introduced into the stirred mixture by being steadily run therein over 40 minutes; no distillation of water was carried out during the period of addition of the dimer acid and the autogenous pressure rose to 1.7 MPa.

At the end of the addition of the dimer acid, the weight of residual water was 204.85 g and the ratio $r_1$, defined above, had a value of 0.932.

The autoclave pressure was then gradually released down to atmospheric pressure over a period of 1 hour, 40 minutes, and the temperature was gradually increased to 260° C. over the same period, while water was simultaneously distilled off.

A pressure of 500 $10^2$ Pa was then gradually established over 30 minutes, while the mixture was maintained at 260° C. and the polycondensation was completed by continuing to stir the mixture for 40 minutes at 260° C. and 120 $10^2$ Pa, while a steady distillation of water was continuously ensured.

The loss of hexamethylenediamine, measured upon completion of step (b), was 0.15%.

Stirring was stopped and then a nitrogen pressure of 5 $10^5$ Pa was established in the autoclave and the polymer was drawn off. The latter, extruded from the autoclave in rod form, was cooled by passing same through a cold water bath and it was then granuated and dried.

The polymer obtained was perfectly transparent and consequently homogeneous. It had the following characteristics, measured on dry granules thereof:
(1) Melting point (Tm): 242° C.,
(2) Crystallization point on cooling (Tc): 194° C.,
(3) End group contents:
   COOH: 60.16 meq/kg
   NH$_2$: 19.78 meq/kg
(4) Melt viscosity at 260° C. under a shear gradient:
   $\gamma = 10$ s$^{-1}$: 26,000 poises.
(5) Tensile properties:
   break strength: 72 MPa,
   elongation at break: 350%,
   tensile modulus: 630 MPa,
(6) Torsional thermomechanical properties; torsional modulus at:
   $-20°$ C.: 720 MPa,
   0° C.: 700 MPa,
   $+20°$ C.: 580 MPa, +40° C.: 320 MPa,
+60° C.: 160 MPa.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a homogeneous copolyamide having a high melting point and good flexibility, comprising, in a first step (a), prepolymerizing, in the absence of or presence of water;
   (i) a mixture of adipic acid, or a mixture of adipic acid and at least one other short-chain dicarboxylic acid, hexamethylenediamine, and a catalytically effective amount of either a compound (alpha) or compound (beta), with (alpha) comprising an inorganic oxyacid or an organic oxyacid other than a carboxylic acid, in which at least one of the acid functions thereof has an ionization constant pKa in water at 25° C. not exceeding 4, and (beta) comprising an alkali or alkaline earth metal salt of such acid, or
   (ii) a mixture of stoichiometric salt(s) of said short-chain acid(s) with hexamethylenediamine, free hexamethylenediamine and said catalyst;
   said first step (a) being carried out, in the absence of distillation of water in a closed system, under the following conditions:
   any water initially present in the reaction mixture, expressed as a percentage by weight based on the total amount of water initially present+reactants, does not exceed 45%;
   heating the starting mixture to a temperature of from 200° to 250° C. and prepolymerizing the reactants at such temperature and at an autogenous pressure which is higher than atmospheric for a period of time such that the reaction mixture attains a state of chemical equilibrium of amidification; and then,
   in a second step (b), polycondensing the resulting amino-terminated prepolymer with fatty acid dimer, at a temperature of from 200° to 280° C., at an autogenous pressure which, during addition of the dimer acid, is equal to the prepolymerization pressure, or is higher than such pressure, or decreases gradually from the prepolymerization pressure to atmospheric pressure, and which, after the addition of the dimer acid, either decreases gradually to atmospheric pressure or a pressure less than atmospheric pressure, or remains equal to atmospheric pressure, with water being simultaneously distilled therefrom either during or following addition of the dimer acid, with the proviso that, upon the addition of the dimer acid, the ratio $r_1$ is as follows:

$$\frac{\text{weight of reactants in step (a) + weight of dimer acid}}{\text{weight of reactants in step (a) + weight of dimer acid + weight of residual water}}$$

and the proportions of the various constituents are such that:
   the amount of short-chain acid(s) relative to the total amount of short-chain acid(s)+dimer acid ranges from 50 to 99 mole %;
   the ratio $r_2$ of the number of moles of hexamethylenediamine employed in step (a), mixture (i), relative to the total number of moles of short-chain acid(s) and dimer acid, is equal to 1 or a value greater than stoichiometric, such that an excess of hexamethylenediamine is present to compensate for any loss thereof in step (b) during any pressure release; and
   the ratio $r_3$ of the number of moles of free hexamethylenediamine employed in step (a), mixture (ii), relative to the number of moles of dimer acid, has a value indicated above for the ratio $r_2$.

2. The process as defined by claim 1, comprising conducting the steps (a) and (b) in sequence, with water being present in the reaction mixture at the beginning of step (a), such amount of water initially present not exceeding 45%.

3. The process as defined by claim 1, said at least one short-chain acid comprising adipic acid or admixture thereof with at least one of 1,4-cyclohexanedicarboxylic acid, isophthalic acid or terephthalic acid, the proportion of adipic acid in such admixture being at least 70 mole %.

4. The process as defined by claim 1, said fatty acid dimer comprising polymerization and fractionation product which comprises 80 to 100% by weight of monomeric fatty acid(s) containing from 16 to 20 carbon atoms and 20 to 0% by weight of monomeric fatty acid(s) comprising monomeric fatty acid(s) containing from 8 to 15 carbon atoms, monomeric fatty acids(s) containing from 21 to 24 carbon atoms, or mixtures thereof, such dimer acid comprising a difunctional acid fraction which is greater than 94% by weight, a monofunctional acid fraction which is less than 1% by weight and a fraction of acid of functionality greater than 2 which is less than 5% by weight.

5. The process as defined by claim 4, said fatty acid dimer comprising fractionation product of a hydrogenated composition originating from the catalytic polymerization of monomeric fatty acid(s) containing 18 carbon atoms.

6. The process as defined in claim 1, said catalyst (alpha) comprising sulfurous, sulfuric hypophosphorous, phosphorous, orthophosphoric or pyrophosphoric acid.

7. The process as defined by claim 1, said catalyst (alpha) comprising an organosulfonic acid of the formula $R_1$—$SO_3H$ (I), in which $R_1$ is a straight or branched chain alkyl radical containing from 1 to 6 carbon atoms; a phenyl radical unsubstituted or substituted by 1 to 3 alkyl radicals containing from 1 to 3 carbon atoms; a phenylalkyl radical containing from 1 to 3 carbon atoms in the alkyl moiety or said phenylalkyl radical wherein the phenyl is substituted by 1 to 3 alkyl radicals containing from 1 to 3 carbon atoms; or a naphthyl radical unsubstituted or substituted by 1 to 4 alkyl radicals containing from 1 to 3 carbon atoms.

8. The process as defined by claim 1, said catalyst (alpha) comprising an organophosphonic acid of the formula $R_2$—$P(O)(OH)_2$ (II), in which $R_2$ is a straight or branched chain alkyl radical containing from 1 to 6 carbon atoms; a phenyl radical unsubstituted or substituted by 1 to 3 alkyl radicals containing from 1 to 3 carbon atoms; or a phenylalkyl radical containing from 1 to 3 carbon atoms in the alkyl moiety or said phenylalkyl radical wherein the phenyl is substituted by 1 to 3 alkyl radicals containing from 1 to 3 carbon atoms.

9. The process as defined in claim 1, said catalyst (alpha) comprising an organophosphonic acid of the formula $R_3R_4-P(O)(OH)$ (III), in which $R_3$ and $R_4$, which are identical or different, are each a straight-chain alkyl radical containing from 1 to 3 carbon atoms; a phenyl radical unsubstituted or substituted by 1 to 3 alkyl radicals containing from 1 to 3 carbon atoms; or a phenylalkyl radical containing from 1 to 3 carbon atoms in the alkyl moiety or said phenylalkyl radical wherein the phenyl is substituted by 1 to 3 alkyl radicals containing from 1 to 3 carbon atoms.

10. The process as defined by claim 1, said catalyst (alpha) comprising an organophosphonous acid of the formula $R_5H-P(O)(OH)$ (Iv), in which $R_5$ is a straight or branched chain alkyl radical containing from 1 to 4 carbon atoms; a phenyl radical unsubstituted or substituted by 1 to 3 alkyl radicals containing from 1 to 3 carbon atoms; or a phenylalkyl radical containing from 1 to 3 carbon atoms in the alkyl moiety or said phenylalkyl radical wherein the phenyl is substituted by 1 to 3 alkyl radicals containing from 1 to 3 carbon atoms.

11. The process as defined by claim 1, said catalyst (alpha) comprising hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acid.

12. The process as defined by claim 1, said catalyst (beta) comprising the sodium or potassium salt of the catalyst (alpha).

13. The process as defined by claim 1, wherein the amount of strong acid (alpha) or salt (beta), expressed as a weight percentage relative to the product copolyamide, ranges from 0.01 to 1%.

* * * * *